UNITED STATES PATENT OFFICE.

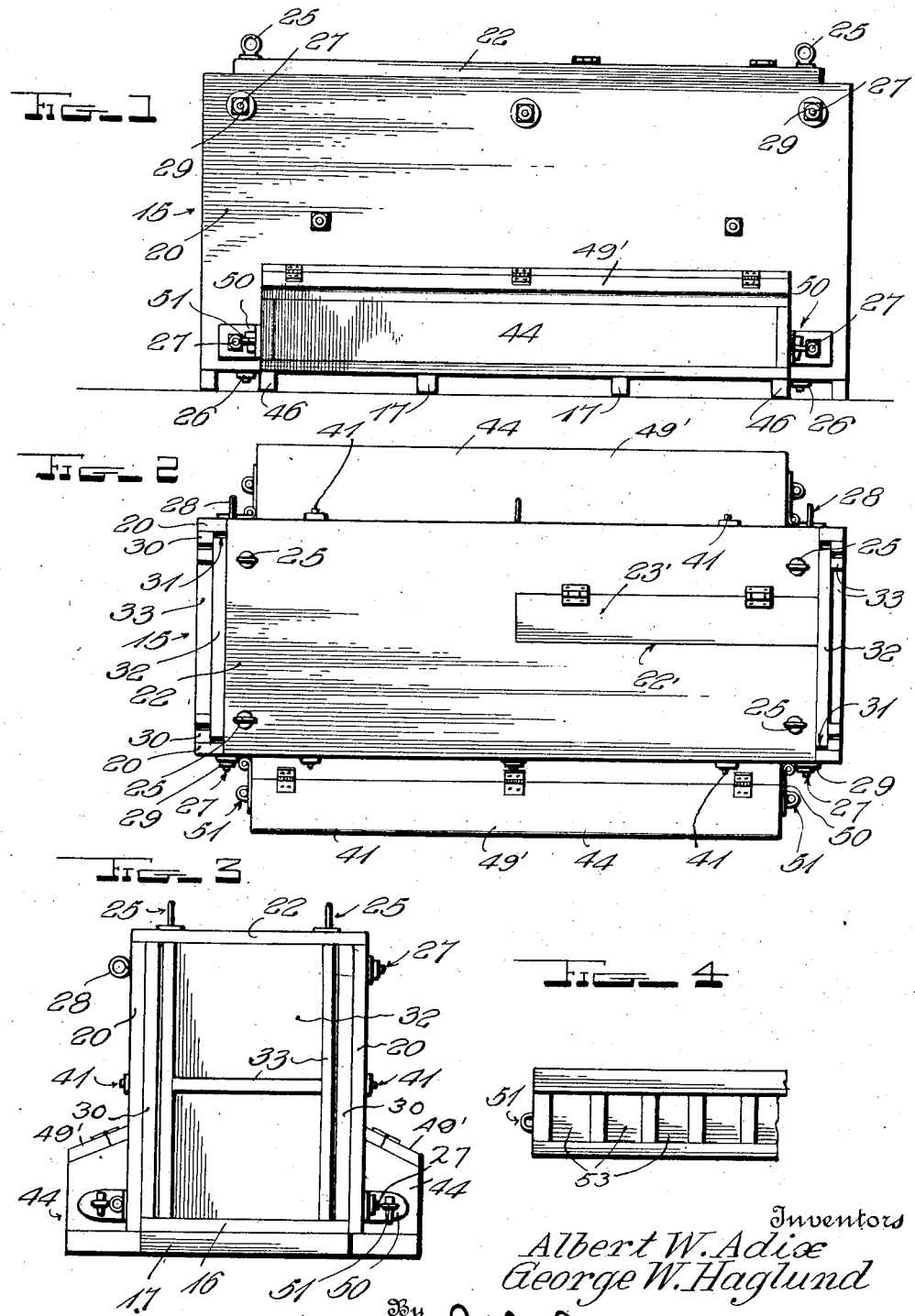

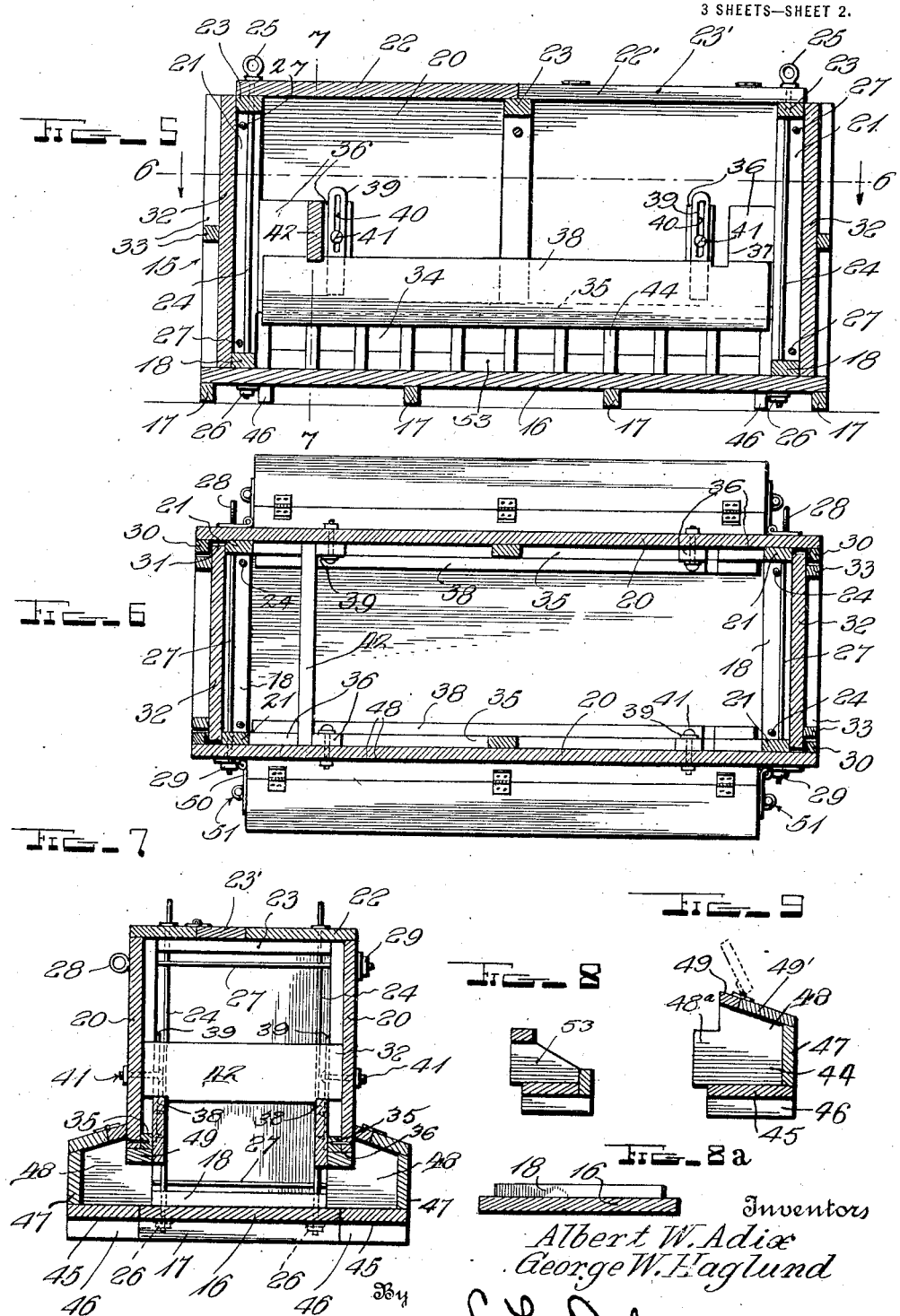

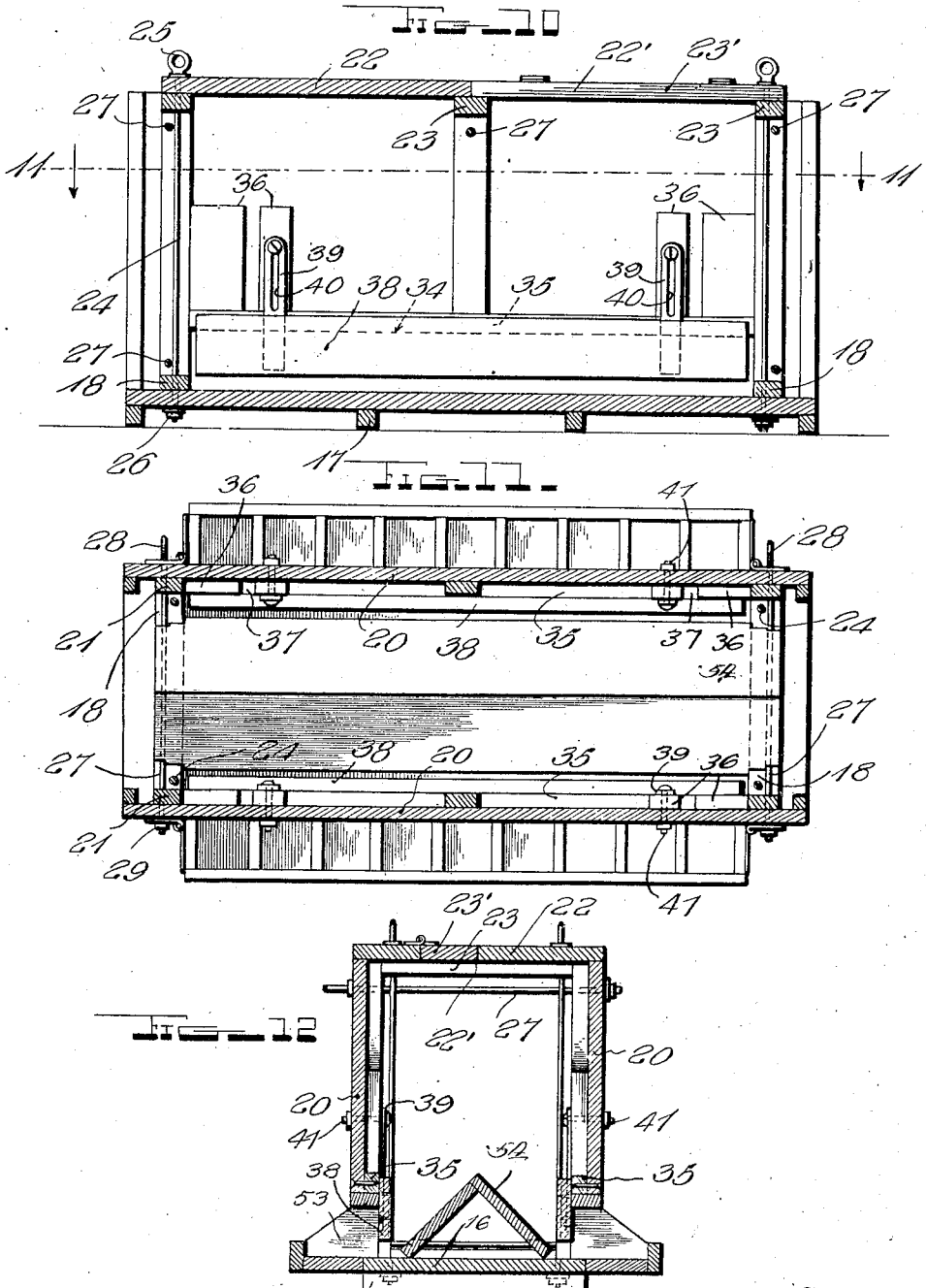

ALBERT W. ADIX AND GEORGE W. HAGLUND, OF BOONE, IOWA.

FARROWING-CRATE.

1,361,660.

Specification of Letters Patent.  Patented Dec. 7, 1920.

Application filed April 4, 1919.  Serial No. 287,541.

*To all whom it may concern:*

Be it known that we, ALBERT W. ADIX and GEORGE W. HAGLUND, citizens of the United States, residing at Boone, in the county of Boone and State of Iowa, have invented certain new and useful Improvements in Farrowing-Crates, of which the following is a specification.

Our invention relates to a combined farrowing crate and feeder.

An important object of the invention is to provide a device of the above mentioned character, which may be readily converted into a farrowing crate or a feeder, and which is formed in parts which are readily separable, so that the device may be shipped in the collapsed condition.

Other objects and advantages of the invention will be apparent during the course of the following description.

In the accompanying drawings, forming a part of this specification and in which like numerals are employed to designate like parts throughout the same, Figure 1 is a side elevation of the device used as a farrowing crate, Fig. 2 is a plan view of the same, Fig. 3 is an end elevation of the device, Fig. 4 is a fragmentary plan view of the feeder-attachment removed, Fig. 5 is a central vertical longitudinal sectional view through the device used as a feeding crate, Fig. 6 is a horizontal sectional view, taken on line 6—6 of Fig. 5, Fig. 7 is a transverse sectional view taken on line 7—7 of Fig. 5, Fig. 8 is a transverse section through the feeder-attachment, removed, Fig. 8ª is a transverse section through the floor of the crate, Fig. 9 is a transverse sectional view through the farrowing attachment, removed, Fig. 10 is a central vertical sectional view through the device, used as a feeder, with feed regulating board lowered, Fig. 11 is a horizontal section taken on line 11—11 of Fig. 10, and, Fig. 12 is a transverse sectional view taken on line 12—12 of Fig. 10.

In the drawings, wherein for the purpose of illustration is shown a preferred embodiment of our invention, the numeral 15 designates a crate or box, as a whole, comprising a bottom 16, provided with exterior reinforcing strips 17, rigidly secured thereto. This bottom is further provided with upper transverse strips 18, rigidly secured thereto, and spaced from the ends thereof, as shown. As shown in Fig. 8ª, the strips 18 are spaced inwardly from the longitudinal edges of the bottom 16.

Sides 20 are arranged upon the bottom 16, at their longitudinal edges, and contact with the ends of the strips 18. These sides are provided with interior transverse strips 21, rigidly secured thereto, and adapted to contact with the bottom 15, and the ends of the strips 18.

A top 22 is provided, having inner transverse strips 23, rigidly secured thereto. The strips 23 terminate at points spaced from the edges of the top 22, and are adapted to engage within the vertical strips 21, the edges of the top 22 contacting with the tops of the sides 20. This top 22 has an inspection opening 22′, normally covered by a swinging door 23′, as shown.

The top and bottom 22 and 16, are clamped to the sides 20 by transverse rods 24, having heads 25, and provided at opposite ends with screw-threads to receive nuts 26. These rods pass through openings in the top and bottom, and the transverse strips thereof, as shown. The sides 20 are also clamped to the top and bottom by horizontal rods 27, passing through openings in the sides and the strips thereof. These rods 27 have heads 28, and nuts 29 have screw-threaded engagement with their opposite ends. It is obvious that the nuts may be unscrewed from the rods, and the rods removed, whereby the parts of the crate are adapted to be separated and collapsed.

Vertical end strips 30 are rigidly secured to the sides 20, upon the interior thereof, and are spaced from the strips 21 for providing grooves 31, which receive vertically movable ends 32. These ends 32 have exterior reinforcing strips 33, as shown.

The sides 20 are provided near their lower edges with longitudinal openings 34, and horizontal strips 35 are secured to the sides at the top of these openings. Vertical spaced strips 36 are secured to the interior of the sides 20, near their ends, and provide vertical grooves 37, for a purpose to be described.

The openings 34 are adapted to be covered by vertically movable feed regulating slides 38, carried by metallic plates 39, having longitudinal slots 40, receiving clamping screws 41, engaging certain of the strips 36. When the device is used as a farrowing crate, the slides 38 are elevated to uncover the openings 34, and these slides are lowered to cover the openings when the device is used as a feeder to regulate the amount of feed used.

The numeral 42 designates a take-up gate, having extensions 43, adapted for insertion within the grooves 37. This gate is employed when a short sow is in the crate and the device used as a farrowing crate, to prevent undue movements. The gate is removed when the device is used as a feeder.

The numeral 44 designates farrowing attachments, to be arranged upon opposite sides of the crate. Each attachment embodies a bottom 45, carrying lower strips 46. An outer vertical strip 47 is secured to the lower strip 45. Transverse ends 48 are arranged upon the bottom 45 and project above the same. A top strip 49 is secured to the upper part of the ends 48. A swinging cover or lid 49′ is pivoted to the strip 49. The end partitions 48 have reduced portions 48ª, which are adapted to enter the opening 34 and are held therein by attaching elements 50, carried by the sides 20, such attaching elements being slotted to receive staples 51, secured to the farrowing attachments, these staples being adapted for receiving bolts or the like.

In Fig. 8 is shown a feeding attachment similar to the farrowing attachment, having chambers 53 with their tops open, as shown.

In Figs. 10 to 12 inclusive, the device is used as a feeder, and the feeding attachments are secured to the sides of the body portion or crate.

An inverted V-shaped feed deflector 54 is now arranged in the body portion and serves to deflect the feed into the pockets 53. The quantity of feed thus supplied into the pockets is controlled by the slides 38, which may be lowered to partly or wholly close the openings 34.

It is to be understood that the form of our invention herewith shown and described is to be taken as a preferred example of the same and that various changes in the shape, size, and arrangement of parts may be resorted to without departing from the spirit of our invention or the scope of the subjoined claims.

Having thus described our invention, we claim:—

1. A combined feeder and farrowing crate, comprising a box-like body portion having sides provided with longitudinal openings, slides arranged inwardly of the sides to cover the longitudinal openings, farrowing attachments placed upon the opposite sides of the body portion and having extensions to enter the longitudinal openings, and means to detachably connect the farrowing attachments with the body portion.

2. A combined feeder and farrowing crate, comprising a box-like body portion including sides, a bottom, top, ends, and means for detachably connecting the same, said sides having longitudinal openings, slides disposed upon the inner side of the sides and adapted to cover the openings, farrowing attachments adapted to be arranged upon opposite sides of the body portion and having portions projecting into the openings, and means for detachably connecting the farrowing attachments with the sides of the body portion.

In testimony whereof we affix our signatures in presence of two witnesses.

ALBERT W. ADIX.
GEORGE W. HAGLUND.

Witnesses:
  LESTER B. SUTTON,
  T. E. GRIFFIN.